B. R. BONNEY.
POULTRY PERCH.
APPLICATION FILED JAN. 9, 1912.
1,038,079.
Patented Sept. 10, 1912.
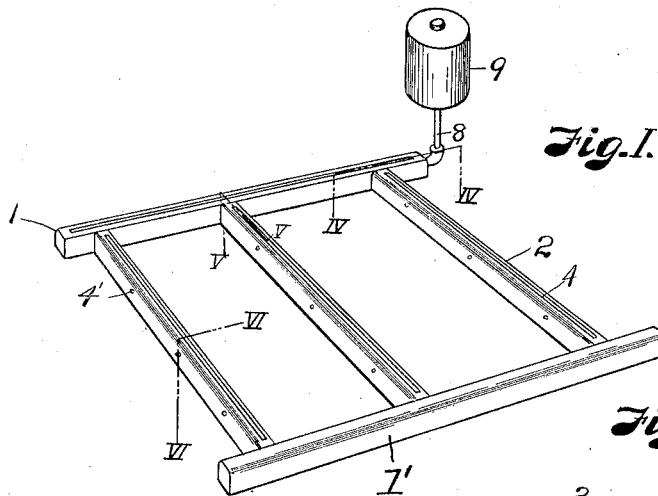
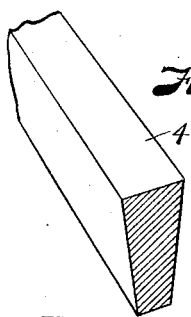
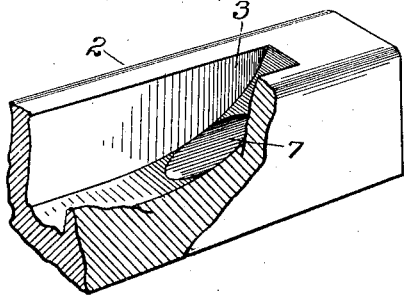
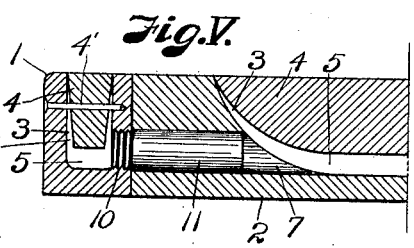
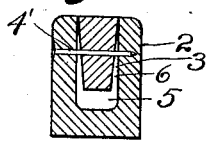
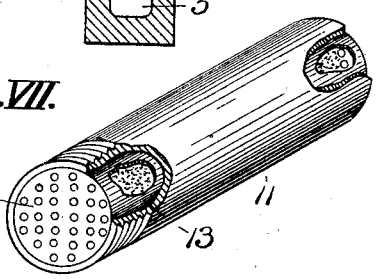
WITNESSES:
Arthur W. Capo.
W. Budd
INVENTOR
B. R. Bonney.
BY
Arthur C. Brown
ATTORNEY
COLUMBIA PLANOGRAPH CO., WASHINGTON, D. C.

UNITED STATES PATENT OFFICE.

BICK R. BONNEY, OF KANSAS CITY, MISSOURI, ASSIGNOR TO EMMETT A. BITTEL, OF KANSAS CITY, MISSOURI.

POULTRY-PERCH.

1,038,079.  Specification of Letters Patent.  Patented Sept. 10, 1912.

Application filed January 9, 1912. Serial No. 670,144.

*To all whom it may concern:*

Be it known that I, BICK R. BONNEY, a citizen of the United States, residing at Kansas City, in the county of Jackson and State of Missouri, have invented certain new and useful Improvements in Poultry-Perches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to poultry perches, and has for its principal object to provide a device of that character whereby a medicated solution may be distributed so that fumes therefrom may rise from the perch to kill lice or the like on fowls resting on the perch bars, the apparatus including in combination with the supporting frame and perch bars, a liquid supply and connection through which the solution is conducted to the separate bars. In accomplishing this object I have provided improved details of structure hereinafter described and illustrated in the accompanying drawings, wherein:—

Figure I is a perspective view of a perch constructed according to my invention. Fig. II is an enlarged perspective view of one of the perch bars with the plug rail removed, part of the bar being broken away for better illustration. Fig. III is a detail perspective of a part of one of the plug rails. Fig. IV is a sectional view of one of the frame beams, showing a part of the supply conduit taken on the line IV—IV, Fig. I. Fig. V is a sectional view of the frame beam and one of the perch bars on the line V—V, Fig. I. Fig. VI is a cross section of one of the perch bars on the line VI—VI, Fig. I. Fig. VII is an enlarged detail view of one of the members connecting the frame beam conduit with the perch bar conduit.

Referring more in detail to the parts:—

1—1' designate frame beams and 2 perch bars which are mounted on and connect the beams 1. The first beam 1 has a groove 3 opening through its upper face and terminating short of the ends to provide a trough, the top of which is closed by a rail 4 which is preferably wedge shaped and of less depth than the trough to provide a channel 5 in the bottom of the trough and open spaces 6 along the lower edge of the rail. The rail is preferably secured in the trough by nails 4' or the like. The upper face of the rail terminates flush with the upper face of the beam 1 to provide a smooth perch base, and one end of the beam is drilled to provide a conduit 7, the bottom of which is in line with the beam groove 5. The second beam 1' is preferably made solid and may be attached to the side of a poultry house. Screwed into the bore 7 is a pipe 8 which is turned upwardly and carries a tank 9 containing a suitable medicated solution.

Opening laterally through beams 1 at suitable intervals throughout its length are apertures 10, the bottoms of which are in the same plane with the bottoms of the beam grooves, and the faces of which are screw threaded to receive nipples 11 which project inwardly from the beam. Mounted on the nipples 11 and screwed or otherwise secured to the beam 1' are perch bars 2 which abut against the inner faces of the frame beams and have grooves and plug rails similar to those in the frame beam, each of said bars however being provided with a conduit 7 at each end for receiving the nipples 11 that project inwardly from the frame beam. While the nipples may ordinarily comprise open tubes or pipe sections, I prefer to provide each of said nipples with a filling core 13 which may consist of a tube of the same length as the nipple but having an apertured cap 14 at each end. The core is filled with sawdust or the like through which the solution may seep to pass from the first frame beam to the perch bars.

The beams and bars are preferably made of hard wood through which liquid will not readily pass, and the plug rails of softer wood through the pores of which the solution may be drawn by capillary attraction so that the upper expanded surfaces are moistened thereby and so that fumes therefrom may rise to fowls perching on the bars.

In using the device the frame is mounted in a poultry house so that the beams and bars are level, the tank being above the frame so that liquid may drain from the tank into the first perch beam and thence into the bars. After entering the first beam, the liquid flows downwardly through the bottom of the groove, beneath the plug rail, moistening the rail, and passing through the nipples into the perch bars. The solution passing through the conduits in the bars moistens the rails in the bars and fumes from the top of the bars rise over the bodies of the fowls and kill lice or mites thereon. By providing the nipples with the filled cores, the flow of solution is retarded so that if the plug rails are too porous the seepage therethrough may be retarded.

Having thus described my invention what I claim as new therein and desire to secure by Letters-Patent is:—

1. In a poultry perch, a bar having a trough opening through its upper surface and terminating near the ends thereof, a wedge shaped plug member located in the open portion of said trough and terminating flush with the top of the bar, said plug member being of relatively porous material and providing an open channel at the bottom of the trough and open spaces within the trough near the narrowed lower edge of the rail substantially as set forth.

2. A poultry perch, comprising a beam member having a trough and having a bore extending through its end into the trough, a bar having a trough portion and having a conduit extending through its end and communicating with the trough portion, a wedge shaped plug rail of porous material located in the open top of the trough of said beam and in each of said bars, a nipple in each of the said conduits projecting from the bar and through the side of the beam into the beam trough to afford support for the perch bar, and a core in said nipple comprising a tube having a porous filler and perforated ends, substantially as and for the purpose set forth.

3. A poultry perch, comprising side beams, one of said beams having a trough and having a bore extending through its end into the trough, a supply pipe extending through said bore and adapted for delivery into the beam trough, perch bars mounted on said beams and having troughs similar to the beam trough, each of said bars having an opening through its end for communicating with the beam trough near the bottom thereof, a nipple in each of said openings projecting from the bar and through the side of the frame beam into the beam trough to afford support for the perch bar, and a wedge shaped plug rail located in the open top of the trough in said first beam, and in each of said bars, said rails being of porous material, and terminating flush with the top of its supported member substantially as and for the purpose set forth.

In testimony whereof I affix my signature in presence of two witnesses.

BICK R. BONNEY.

Witnesses:
ROBERT WADE,
ARTHUR C. BROWN.

Copies of this patent may be obtained for five cents each, by addressing the "Commissioner of Patents, Washington, D. C."